United States Patent [19]

Allegre

[11] Patent Number: 5,604,016

[45] Date of Patent: Feb. 18, 1997

[54] INFORMATION-MEDIUM SLEEVE AND PROCESS FOR MANUFACTURING IT

[75] Inventor: Jean-Luc Allegre, Villefontaine, France

[73] Assignee: Decomatic S.A., societe anonyme, La Verpilliere, France

[21] Appl. No.: 409,982

[22] Filed: Mar. 24, 1995

[30] Foreign Application Priority Data

Mar. 29, 1994 [FR] France .................................. 94 03677

[51] Int. Cl.⁶ ....................................................... B32B 9/00
[52] U.S. Cl. ...................... 428/192; 428/35.1; 428/36.9; 428/36.92; 428/43; 428/57; 428/1; 428/37; 428/194; 428/204; 283/81; 283/98; 206/427; 156/86
[58] Field of Search ....................... 428/137, 354, 428/36.92, 204, 192, 43, 40, 194, 157, 57, 102; 283/81, 101, 98; 206/427; 156/290, 456, 86

[56] References Cited

U.S. PATENT DOCUMENTS 5,263,743  11/1993  Jones .......................................... 283/81

FOREIGN PATENT DOCUMENTS 1.043.230  6/1953  France .
3924790  7/1991  Germany .

Primary Examiner—Patrick Ryan
Assistant Examiner—Abraham Bahta
Attorney, Agent, or Firm—Larson and Taylor

[57] ABSTRACT

Sleeve intended to be placed around a container, such as a can or the like, in order to constitute an information medium and formed by a body made of a plastic sheet which is shaped in order to fit on the perimeter of the container and capable of taking printing, wherein at least two flap-forming parts (7, 8) are fixed to the sleeve body (6) by a fixing mechanism (5), each by a first edge parallel to the generatrix of the body (6), and extending so as to be able to end up covering all or part of the sleeve body (6), and wherein at least one of the faces of the flap-forming parts is also capable of taking or displaying printing.

13 Claims, 7 Drawing Sheets

INFORMATION-MEDIUM SLEEVE AND PROCESS FOR MANUFACTURING IT

The present invention relates to sleeves intended to be placed around a container such as a can or the like, in order to constitute an information medium. These sleeves are generally formed from a body made of a sheet of plastic which is shaped in order to fit on the perimeter of the container, for example having a cylindrical shape. This means that the body of the sleeve is formed before mounting it on the container, around which it may be fitted by stretching, for example. The present invention also relates to a process for manufacturing sleeves of this type.

These sleeves have the drawback of presenting a limited area for displaying the information concerning the product contained in the container. This is particularly true in the field of phytosanitary products delivered in powder form or in liquid form in cans, where, for reasons of legislation, the manufacturers are obliged to provide ever increasing amounts of information.

This is why the use has developed, in this field, of complementary information means of the adhesive pocket type, into which pocket is inserted a complementary leaflet that the manufacturer affixes to the actual sleeve. The risks of these pockets being torn off while these cans are being transported and handled and of the complementary leaflet being lost after consultation are the main drawbacks thereof.

In the field of paper labels, it had indeed been proposed in the Fifties to add a detachable extra panel (French Patent FR-A-1,043,230).

Hitherto, a plastic sleeve with a large information display area had, however, never been proposed. In any event, the greatest difficulty would have been to conceive an embodiment allowing manufacture with costs acceptable in industry.

The object of the present invention is therefore to remedy the drawbacks of the sleeves of the prior art, by providing a sleeve possessing an information display area which is greatly increased compared to the conventional sleeves, especially by 100 to 400%, while still satisfying an essential condition which is not to significantly increase the manufacturing cost compared to conventional sleeves.

Another object of the invention is to propose a simple and rapid process for continuously manufacturing these sleeves from a reel of plastic film or sheet, which process can be entirely automated.

Another object of the invention is also to propose such a process which can be implemented even within the context of sleeves intended to have small, or indeed very small, mediums.

Yet another object of the invention is to propose such a sleeve which can, easily and with lower cost, be modified in many variants.

The subject of the present invention is thus a sleeve intended to be placed around a container, such as a can or the like, in order to constitute an information medium and formed by a body made of a plastic sheet which is shaped in order to fit on the perimeter of the container and capable of taking printing, wherein at least two flap-forming parts are fixed to the sleeve body by a fixing means, each by a first edge parallel to the generatrix of said body, and extend so as to be able to end up covering all or part of the sleeve body, and wherein at least one of the faces of the flap-forming parts is also capable of taking or displaying printing.

The invention especially allows this sleeve to be designed and produced from a single sheet of plastic, without having to cut the latter and to attach and fix the various elements constituting the sleeve, this being very advantageous as regards the production costs which must be kept very low in order to allow it to be actually exploited industrially.

It is therefore preferable that the entire sleeve, with all its flap-forming parts and regardless of how many of them there are, be formed from one and the same sheet of plastic.

This construction is, in particular, made possible by virtue of the very advantageous characteristic which consists of the fact that the flap-forming parts are connected in pairs to the sleeve body by the same fixing means, this resulting, as regards the manufacturing process, in performing, in a single pass, a fixing operation common to the two flap-forming parts.

While still remaining in particular within the scope of a construction made from just one single sheet of plastic, it is possible to design extra flap-forming parts. In particular, the invention provides, very advantageously, two types of variation in the sleeve, which may furthermore be combined together, and with characteristics already described, namely, on the one hand, a type in which flap-forming parts are connected separately to the sleeve body at points diametrically opposite each other with respect to the sleeve body and, on the other hand, a type in which flap-forming parts are fixed together one after the other, one of them also being fixed to the sleeve body. The advantage is further increased by the fact that each flap-forming part can very advantageously be formed from two sheet parts which can still come from the same initial sheet of plastic. Two sheet parts, which correspond, form a double panel. The invention also provides for the two edges of these panels, parallel to the generatrix of the sleeve body, to be able to be fastened together by fixing means. In particular, this may involve edges joined to the sleeve body or to other flap-forming parts, or else free edges which are not joined to other constituent elements of the sleeve. Depending on the terms of the invention, a double panel closed at its two edges parallel to the generatrix constitutes a single flap-forming part.

A particular embodiment provides for at least some of the flap-forming parts to be able to be entirely detachable, by virtue of the presence of at least one prescore line extending substantially parallel to the folding line and in the vicinity of a fixing means or on this means. Thus, two flap-forming parts of the same double panel may be individually or conjointly detachable depending on whether the prescore line is made in the fixing means, in particular a weld zone, or whether on the contrary there is a closed double panel. It is therefore also possible to detach such a double panel, leaving it closed at its two opposite edges. Likewise, in the case where the sleeve includes more than one pair of flap-forming parts (that is to say more than one double panel), one or more or all of them may be rendered detachable. All these combinations are allowed.

The sleeve may further include joining means for removably connecting the sleeve body to the free edge, parallel to the generatrix of said body, of the two flap-forming parts, this means enabling, or otherwise, to make more than one join between these parts and the sleeve body. This may, for example, by a releasable adhesive which can be used one or more times.

Instead of such a joining means, it is possible to choose to use a so-called fixing means, in the sense of the invention, that is to say one which precludes release but with which is associated a prescore line made in the flap-forming parts.

In all cases where fixing between parts of a sheet is referred to, this fixing is preferably a weld.

The subject of the invention is also a process for manufacturing such sleeves from one and the same sheet of plastic, which can be carried out continuously and in an entirely automated manner, the sheet or film of plastic being able to be drawn from a reel.

In the process in accordance with the invention, preferably starting from a preprinted sheet, this sheet is folded on itself along a folding line, thus forming two superposed parts of the sheet, and these two parts of the sheet are fastened together along at least one fastening zone which extends substantially parallel to the folding line. Thus, with one fastening zone, a sleeve body will be obtained which is delimited by the folding line and the fastening zone and which is equipped with two flap-forming parts which can also be called an open double panel. It is understood that there is complete freedom in the choice of the point of the fastening zone. If two fastening zones are produced, one double panel, open at one of its edges parallel to the generatrix, and two double panels closed at the two edges (with reference to the edges parallel to the generatrix of the sleeve body) will be obtained, one by the two fastening zones and the other by one fastening zone and by the folding line. Either one of these two closed double panels will be able to be chosen to form the sleeve body. For the various steps in folding and in forming fastening zones, the work will preferably be per half, third, quarter, etc., with reference to the sheet initially folded on itself.

On this basis, the process will also be able to possibly provide a cutting operation dispensing with the folding line, converting the closed double panel into a panel with two free parts (open double panel). Conversely, it will also be possible to produce a fastening zone for fastening the edges of the parts forming an open double panel.

Preferably, the fastening zones are produced by welding. The fastening zones may be chosen to be wide enough to make it possible to produce therein, in a convenient manner, a prescore line so that detaching the double flap does not involve unfastening the corresponding edges of this panel.

After having produced the fastening zones, the various parts forming the sleeve (the sleeve body and the open or closed double panels) are folded back and a removable adhesion means is affixed in order to keep the sleeve in the closed position.

The invention will now be described in more detail with the aid of embodiments of sleeves according to the invention, these being described hereinbelow in conjunction with their manufacturing processes in accordance with the invention and with the appended drawing in which FIGS. 1 to 8 show diagrammatically the manufacturing steps leading, each time, to a sleeve in accordance with an embodiment of the invention.

In all cases, the starting material is a single sheet of plastic, indicated by the numerical reference 1. The first step consists, as may be seen in FIGS. 1 to 8, in an operation of folding or folding over, in order to fold a sheet 1 approximately into two, along a first folding line 2, so that one, 3, of the two free edges 3 and 4 opposite this folding line 2 is slightly set back with respect to the other 4.

Figure 1:
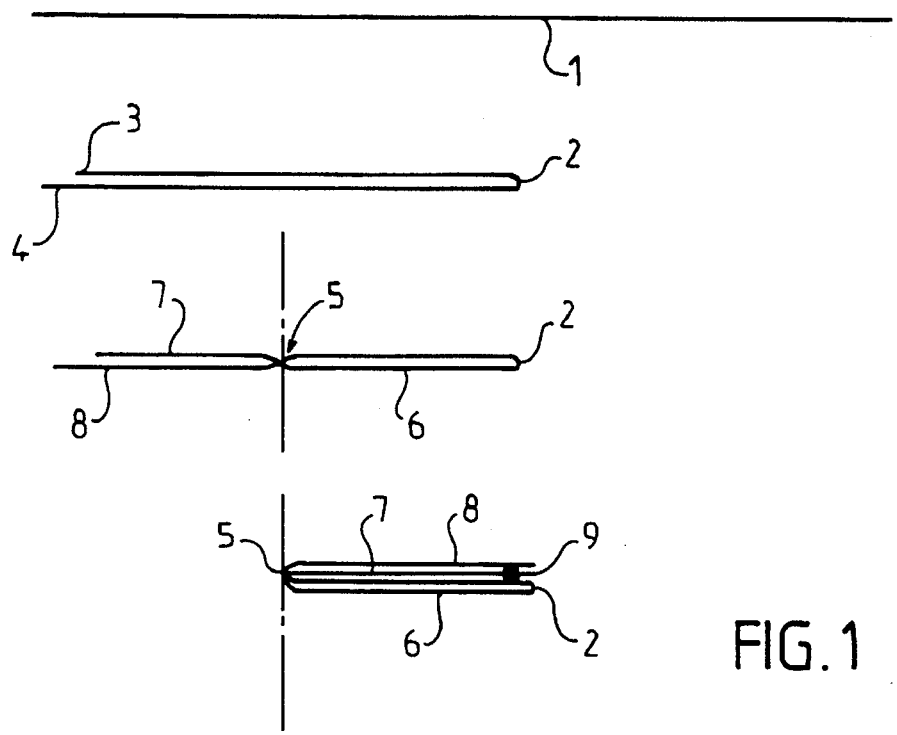
FIGS. 1 to 4 depict, in side view, the steps leading to sleeves which include two flap-forming parts with free edges, this forming an open double panel.

In FIG. 1, a welding pass is next performed so as to weld the two superposed parts of the sheet 1 together along a weld zone 5 essentially parallel to the folding line 2 and lying approximately halfway along the length of the folded sheet. In this way, the sleeve body proper, numerical reference 6, formed by those parts of the sheet which are delimited by the folding line 2 and the weld zone 5 is obtained together with two panels 7 and 8 whose free ends are the edges respectively referenced 3 and 4. These two panels are then folded back onto the sleeve body in such a way that the panel 8, whose length is slightly greater than that of the panel 7, is on the outside. An adhesive means 9, permitting multiple releasing/rebonding operations, lies between the panel 8 and the sleeve body 6, in the vicinity of the folding line 2. This adhesive means 9 may be put into place in any manner known to the specialist.

Figure 2:
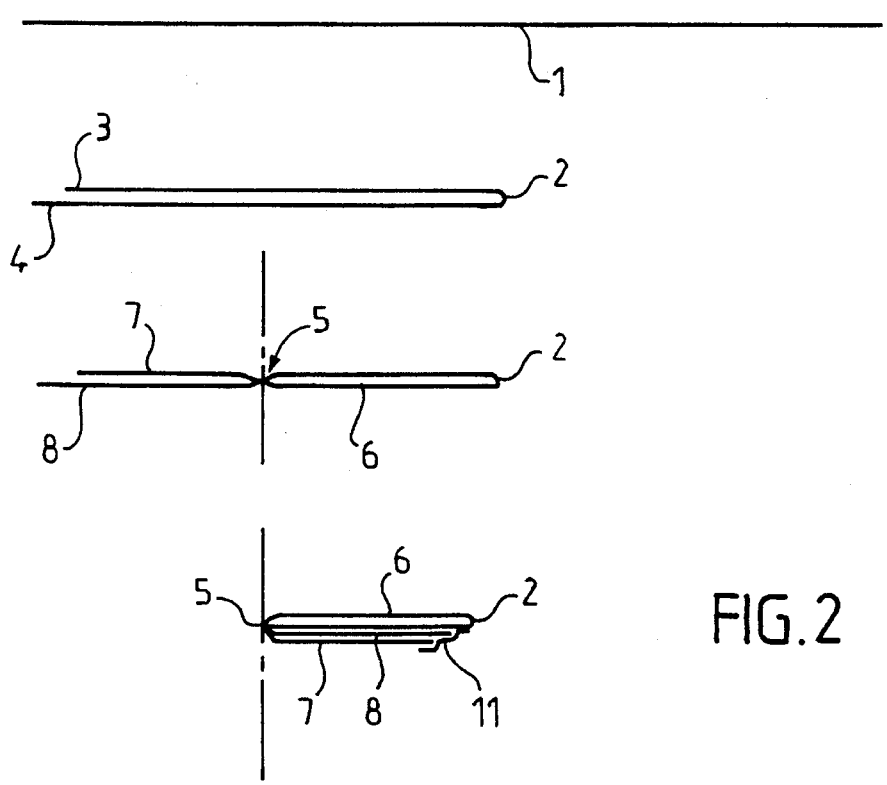

FIG. 2 shows a variant of the process of FIG. 1. The panels 7 and 8 are folded back differently, so that it is the shorter panel 7 which lies on the outside. An adhesive tape 11 is then used to join up the edges 3 and 4 to the sleeve body 6, in the vicinity of the folding line 2.

Figure 3:
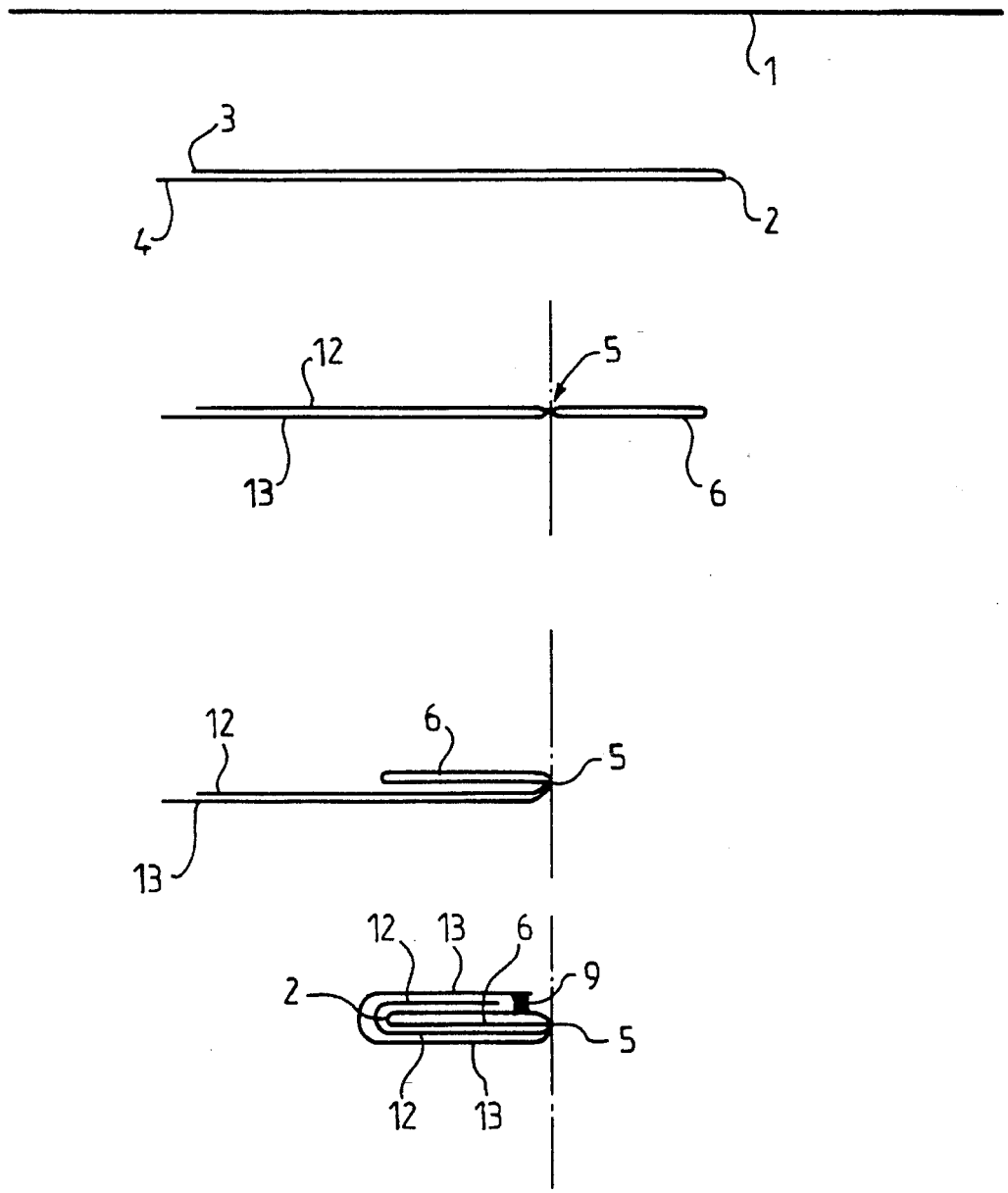

In FIG. 3, after the folding or folding-over operation as in FIGS. 1 and 2, the work is carried out per third, the weld zone 5 being produced approximately one third the way along the length of the folded sheet 1, taken from the folding line 2. In this way, two long panels 12 and 13 are obtained together with the sleeve body 6 which, similar to previously, is then folded back onto the panels 12, 13, or more precisely onto the panel 12, the shorter one. Next, the remaining part of these panels are folded back onto the sleeve body, the panel 12 still being, in this case, the one which is on the side facing the sleeve body. Here too, there is also an adhesive means 9 between the panel 13 and the sleeve body, but in this case in the vicinity of the weld zone 5, in order to keep the panels in the closed position.

Figure 4:
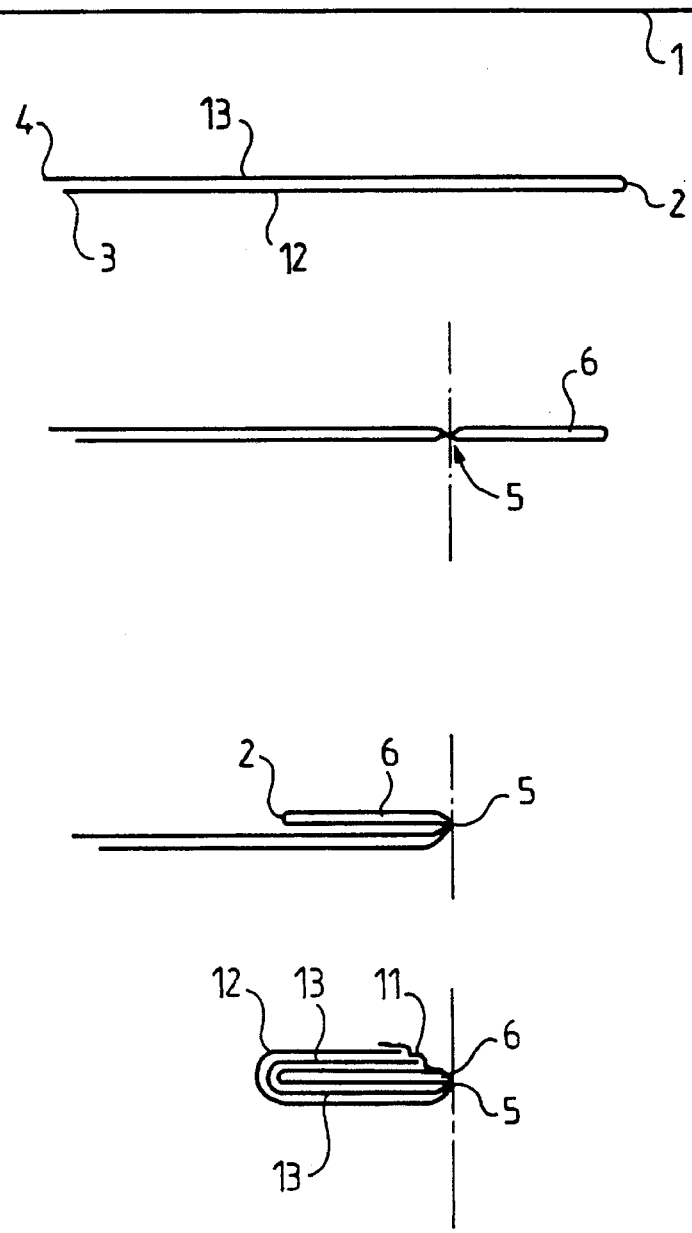

FIG. 4 shows a variant of the process of FIG. 3, in which the sleeve body, which has just been formed, is folded back on the side of the panel 13, the longer one. At the end of the process, the situation is once again as in FIG. 2, in which the panels are kept in the closed position with the aid of an adhesive tape 11 covering the corresponding edge of each of the panels and terminating, in this case, in the vicinity of the weld zone 5.

Figure 5:
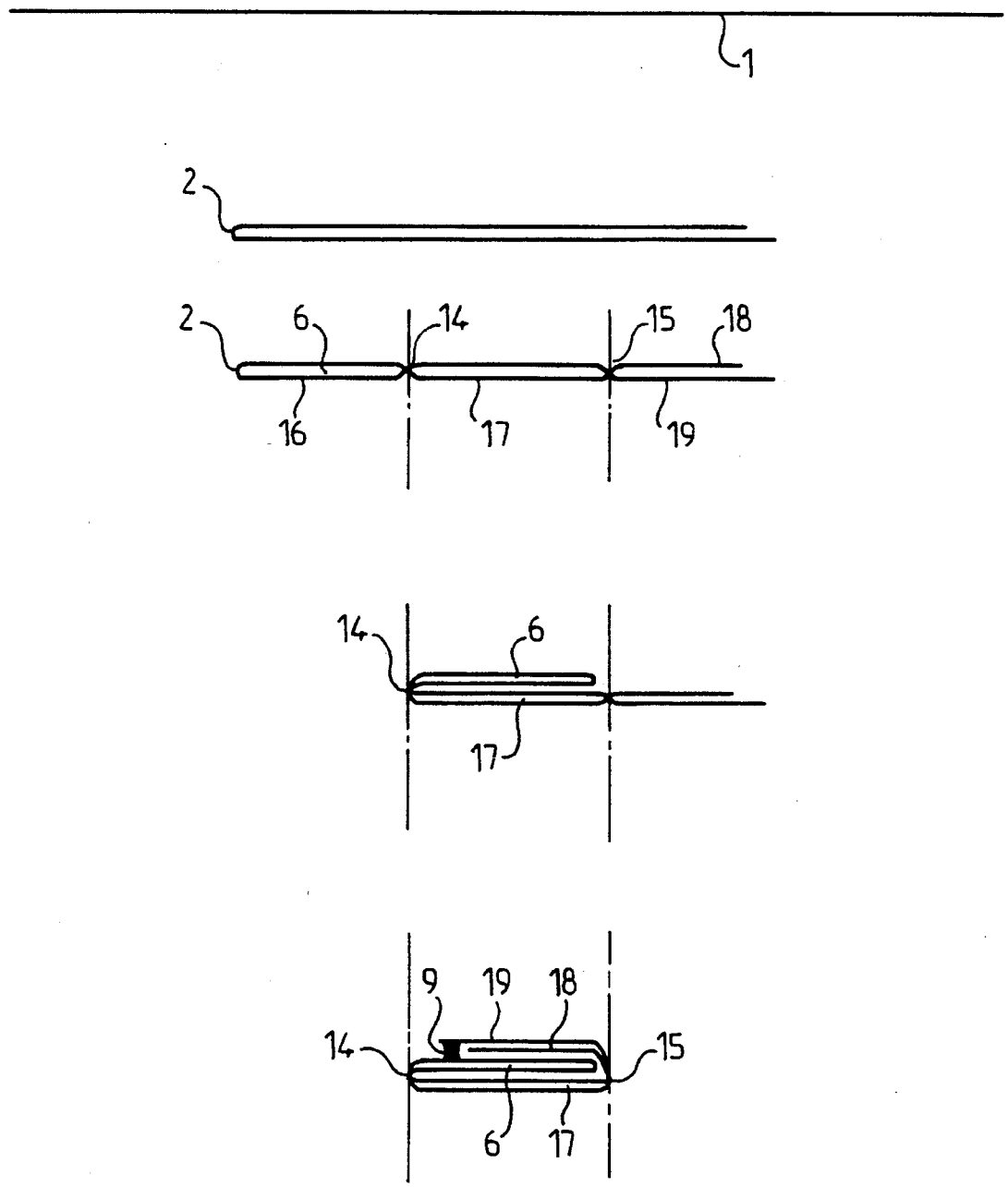
FIGS. 5 and 6 depict, in side view, the steps leading to sleeves which include one closed double panel and one open double panel.

In FIG. 5, the sheet 1 is firstly folded, as previously, so as to end up with two parts of the sheet, one of which is slightly shorter than the other. Two weld zones 14 and 15 are produced simultaneously so as to divide the folded sheet 1 substantially into three. The sleeve body 6 may correspond, as desired, to the part 16 delimited by the folding line 2 and the nearer weld zone 14 or the central part 17 delimited by both weld zones 14 and 15. In FIG. 5, the first solution has been chosen, so that the sleeve body 6 is extended by the part 17 forming a closed double panel which is itself extended by the two free panels 18 and 19, the panel 18 being the shorter one as with the panel 12 of the preceding embodiments.

In the remainder of the process, the sleeve body 6 is folded back onto the part 17 and then the panels 18 and 19 are folded back onto the sleeve body 6, the panel 18 lying on the sleeve body side, but on the opposite side from the part 17 with respect to the latter.

An adhesive means 9 is provided as previously.

Figure 6:
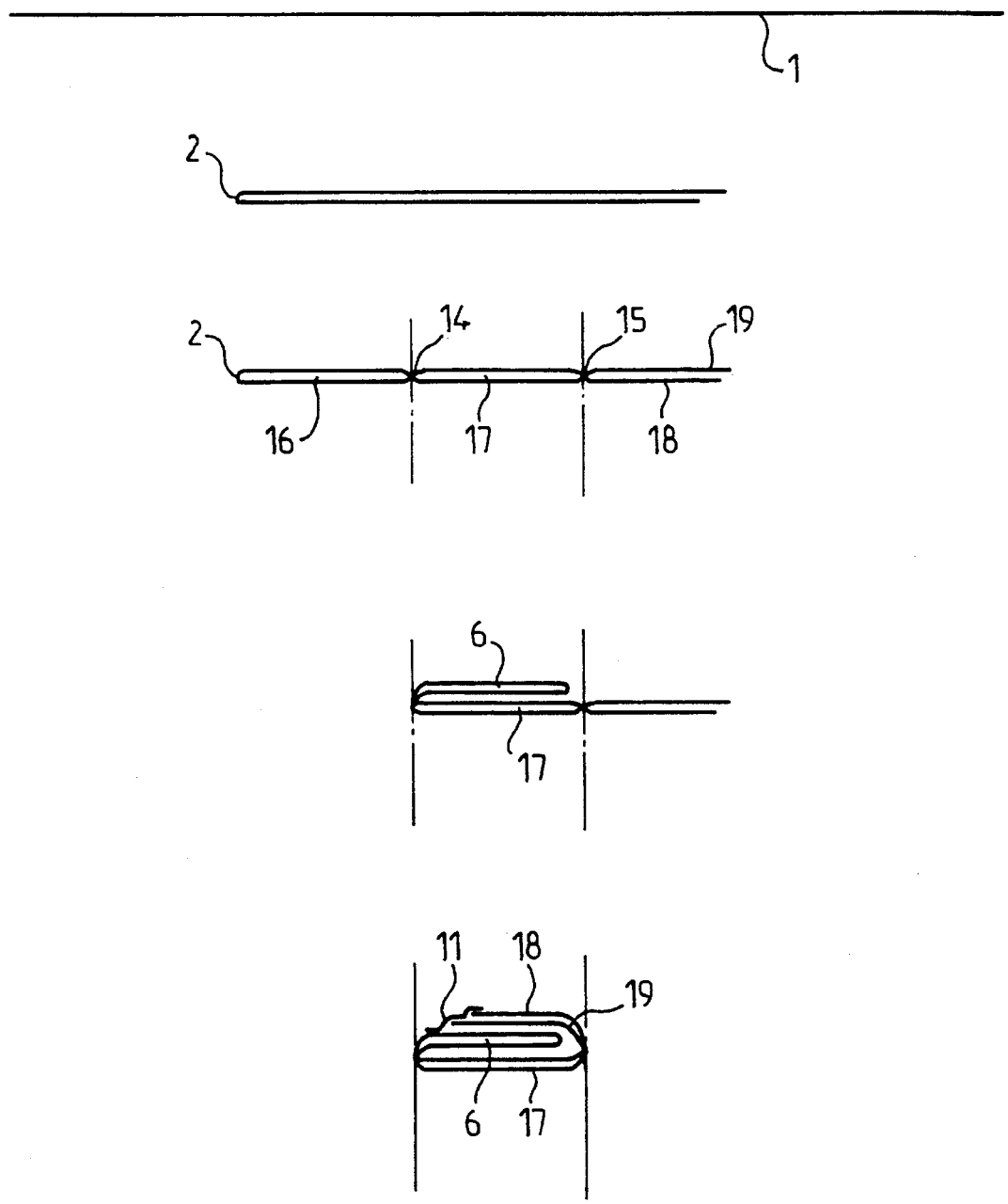

FIG. 6 corresponds to the variant of the process and of the sleeve of FIG. 5, in which the panel 19 faces the part 16, in this case the sleeve body 6, and an adhesive tape 11 is put into place.

Figure 7:
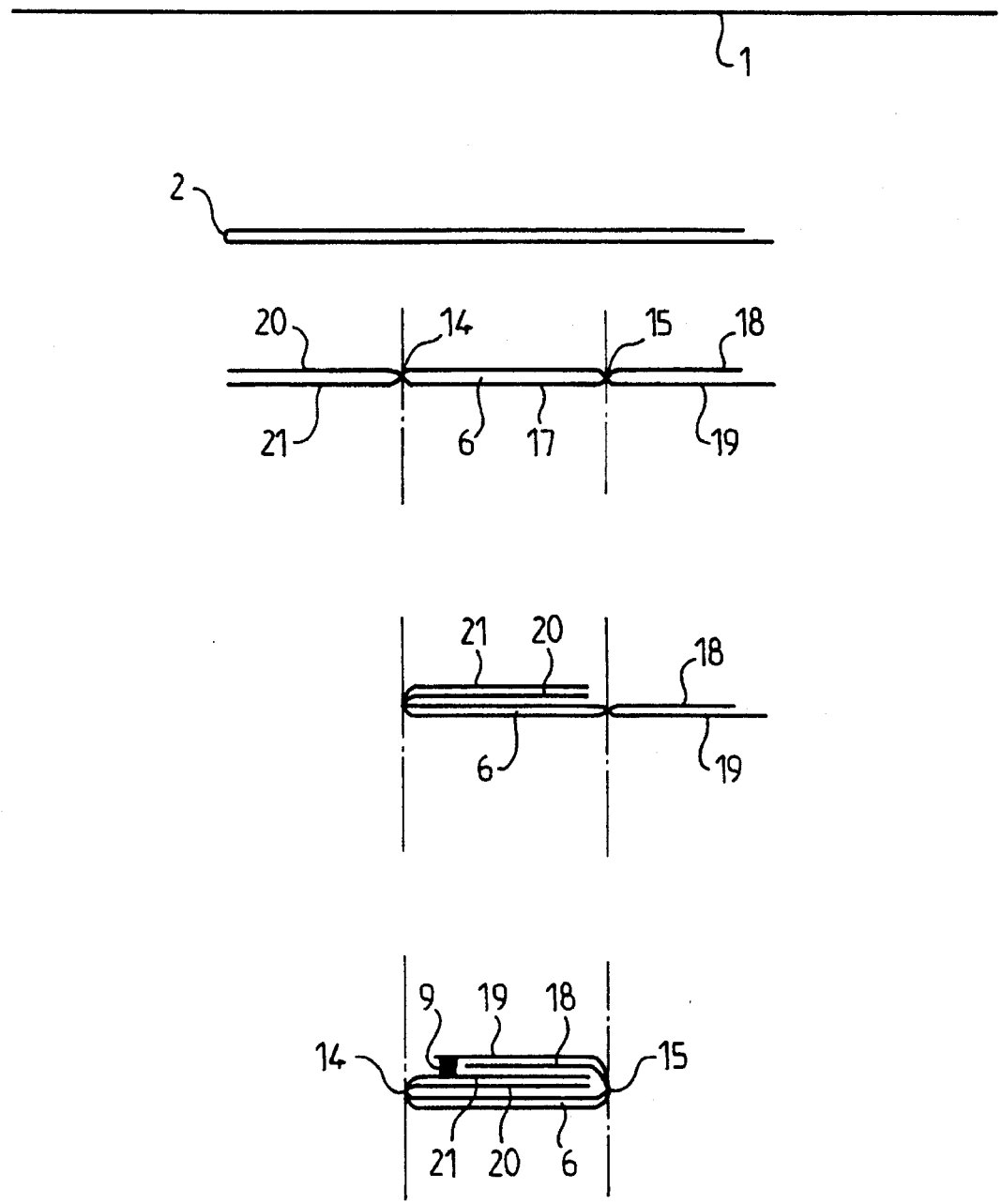
FIGS. 7 and 8 depict, in side view, the steps leading to sleeves which include two open double panels.
Figure 8:
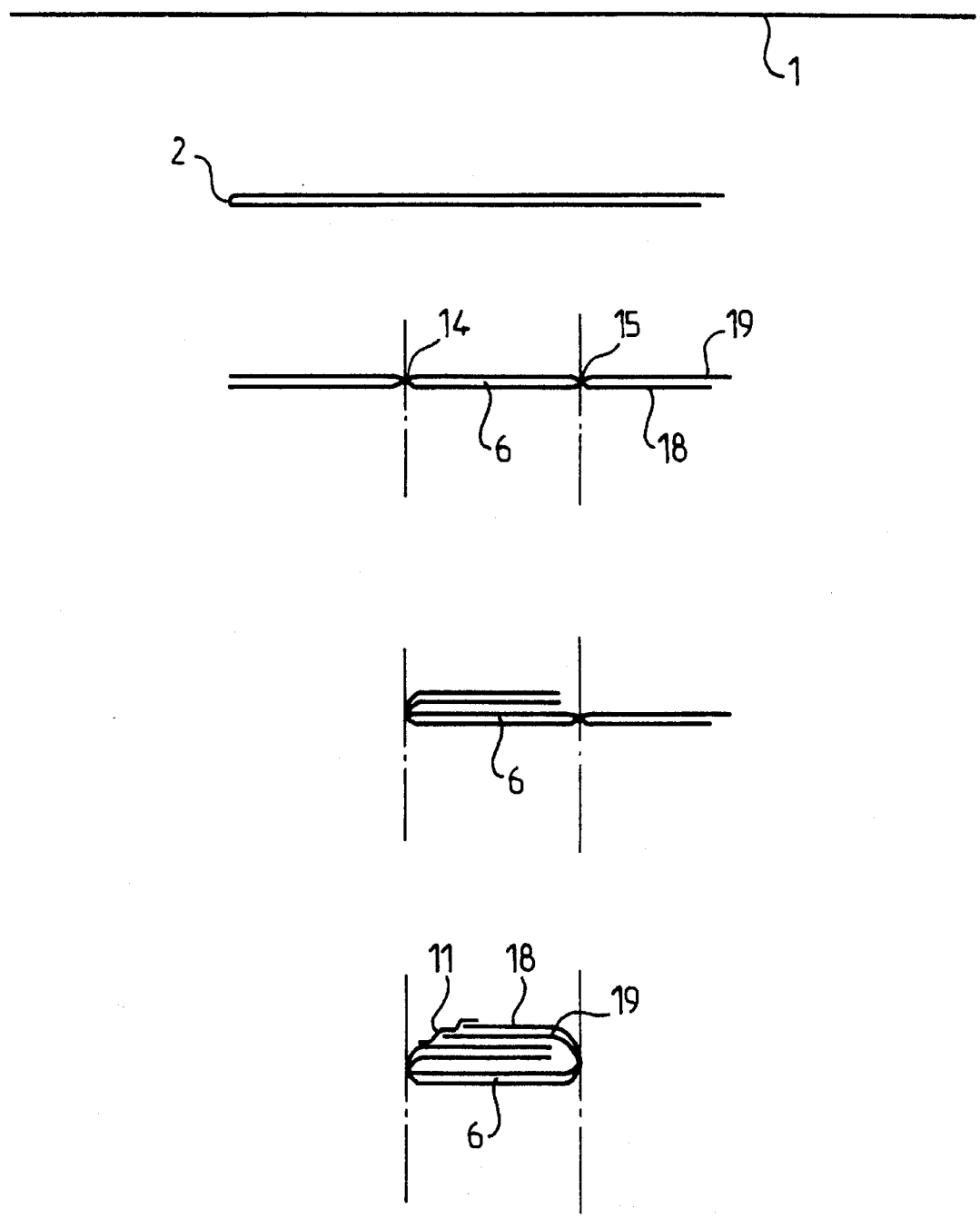

FIGS. 7 and 8 are variants of the processes and sleeves described in relation to FIGS. 5 and 6. In this case, after the operation of folding or folding over the sheet 1, the folding line 2 is removed by cutting, so as to lead, at the end of the process, to a sleeve being obtained in which the sleeve body 6 corresponds to the central part 17 and has two sets of two panels 18, 19 and 20, 21 (open double panels) connected in pairs and to the sleeve body 6 by the respective weld zones 15 and 14. It should be noted that the panels 20 and 21 have the same dimensions and end up being interposed between the sleeve body 6 and the panels 18, 19 in the finished sleeve.

In order to use these sleeves, it is preferable to start with a sheet or film of stretchable polyethylene, the working faces of which have been printed beforehand after an appropriate surface treatment. The inside and/or outside surface of the sleeve bodies 6 is printed, as are the single panels 7, 8, 12, 13, 18, 19, 20 and 21 and the surfaces of the closed double panels 16 or 17. Printed matter on an inside surface of the sleeve body or on a panel can be read through the material.

By prescoring, it is possible to produce sleeves equipped with flap-forming parts which can be detached or with a combination of detachable parts and non-detachable parts. The necessary operations may be completely incorporated in the methods of carrying out the process which have just been described. The process retains its advantageous characteristics in terms of speed and of low manufacturing cost and in terms of continuous and automatic working.

The prescoring may be produced on the unfolded sheet 1, but preferably on this sheet when folded during the so-called first folding or folding-over operation. It may involve one or both parts of a sheet of an open or closed double panel and/or either just one or more than one or all of the panels.

The adhesion means 9 and 11 may be replaced by other removable attachment means, for example by a combined prescoring/welding means. In this latter case, the parts of the sheet forming the panels preferably have substantially equal dimensions. Prescoring is produced along the free edges, for example 3 and 4 (FIG. 1). After having folded back the panels 7 and 8 (having the same dimensions in this case) onto the sleeve body 6, a welding operation (possibly combined with a weld edge cut) is carried out so as to weld together the edges 3 and 4 and the region of the folding line 2.

The plastic constituting the sleeves in accordance with the invention may in particular be stretchable polyethylene. The faces taking the printing may have been able to have been treated, for example using a corona-type treatment, in order to allow this printing. It will be easy to install the finished sleeves by a stretching operation.

The process is conducted continuously and entirely automatically, starting from a reel of preprinted sheet, and enables these improved sleeves to be produced easily, rapidly and inexpensively.

Needless to say the person skilled in the art may, without departing from the scope of the invention, envisage developments as regards both the number of panels and their type.

I claim:

1. A sleeve which is placed around a container having a perimeter in order to constitute an information medium comprising:

a sleeve body made of a single plastic sheet, said sleeve body being tubular shaped to encompass the perimeter of the container and being capable of taking printing thereon;

first and second flap-forming parts, each said flap-forming part having a first edge and at least one face capable of taking or displaying printing; and a fixing means for fixing said first edges of said first and second flap-forming parts to said sleeve body such that said first edges are parallel to a generatrix of said sleeve body and such that said first and second flap-forming parts extend along said sleeve body and hence cover at least a portion of said sleeve body.

2. The sleeve as claimed in claim 1 wherein said first and second flap-forming parts are also formed by the single plastic sheet.

3. The sleeve as claimed in claim 1 wherein said fixing means fixes said first edges together and to said sleeve body so that said first and second flap-forming parts are attached to said sleeve body as a pair.

4. The sleeve as claimed in claim 3 and further including third and fourth flap-forming parts having respective first edges; and a second fixing means for fixing said first edges of said third and fourth flap-forming parts together and to said sleeve body at a diametrically opposite location from said first-mentioned fixing means such that said first edges of said third and fourth flap-forming parts parallel to the generatrix of said sleeve body and such that said third and fourth flap-forming parts are attached to said sleeve body as a second pair.

5. The sleeve as claimed in claim 1 wherein said fixing means fixes said first edge of said first flap-forming part directly to said sleeve body and fixes said first edge of said second flap-forming part to an opposite edge of said first flap-forming part so that said second flap-forming part is attached to said sleeve body via said first flap-forming part.

6. The sleeve as claimed in claim 1 wherein one of said flap-forming parts is a double panel formed of opposed first and second panels, said first and second panels being fixed together at said first edge of said one of said flap-forming parts and having panel edges opposite from said first edge which said panel edges are parallel to said generatrix.

7. The sleeve as claimed in claim 6 wherein panel edges are free such that said first and second panels move freely with respect to one another about said free end.

8. The sleeve as claimed in claim 6 wherein panel edges are attached together such that said first and second panels move together about said free end.

9. The sleeve as claimed in claim 1 wherein said first flap-forming part is prescored along a line parallel to said first edge thereof whereby a first portion of said first flap-forming part can be detached from a second portion thereof including said first edge.

10. The sleeve as claimed in claim 1 and further including a joining means for releasably attaching free ends of said first and second flap-forming parts opposite to said first ends to said sleeve body.

11. The sleeve as claimed in claim 10 wherein said joining means further releasably reattaches said free ends to said sleeve body after said free ends are released.

12. The sleeve as claimed in claim 10 wherein said joining means includes an attaching means for permanently attaching said free ends to said sleeve body and prescore lines in said first and second flap-forming parts adjacent said attaching means whereby a remainder of said first and second flap-forming parts are separable from said free ends.

13. The sleeve as claimed in claim 1 wherein said fixing means is at least one weld.

* * * * *